Jan. 22, 1957 S. G. ROACH 2,778,455
AUXILIARY ACTUATING ATTACHMENT FOR VEHICLE BRAKE SYSTEM
Filed May 17, 1954 3 Sheets-Sheet 1
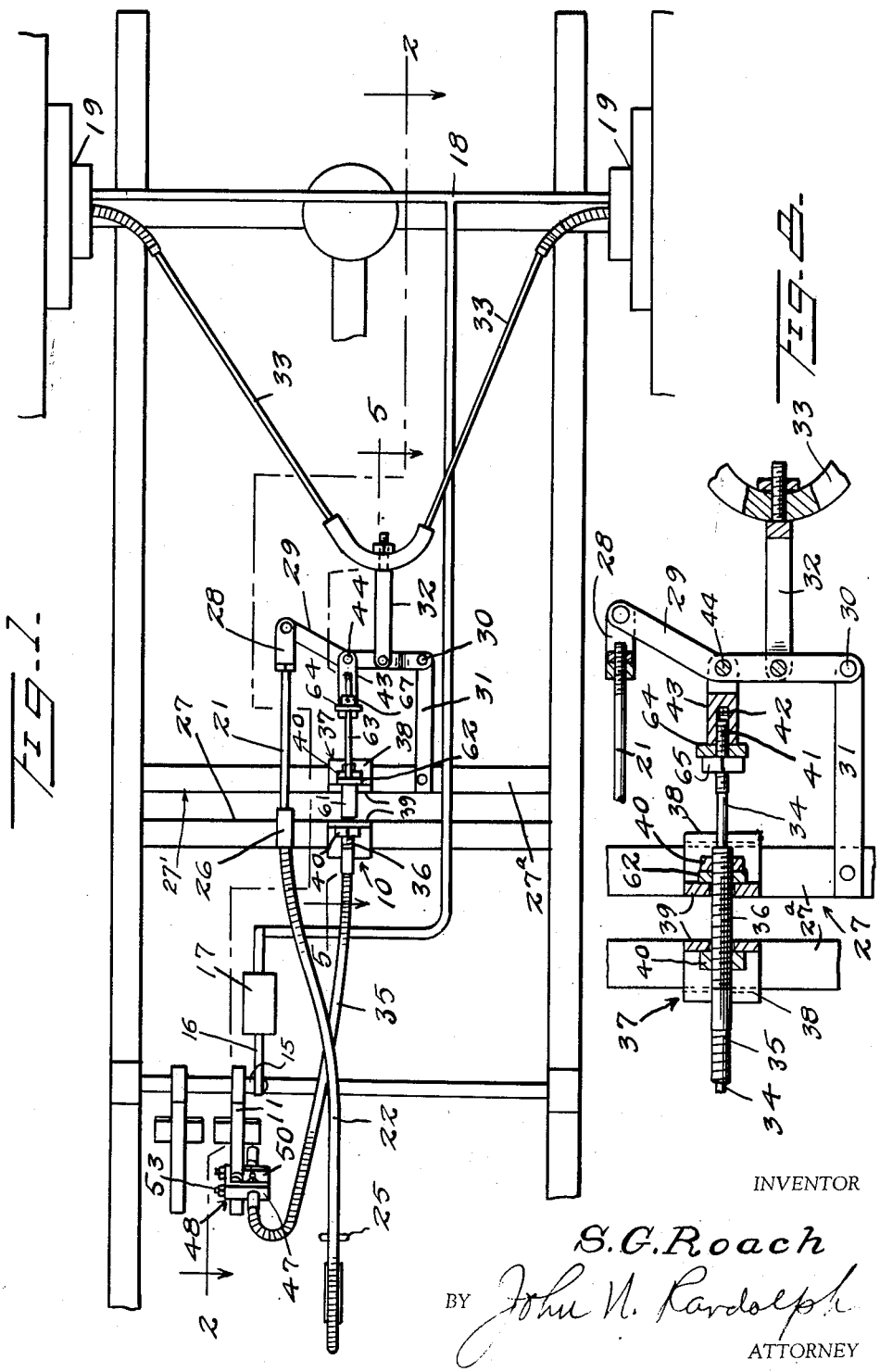
INVENTOR
S. G. Roach
BY John N. Randolph
ATTORNEY Jan. 22, 1957     S. G. ROACH     2,778,455
AUXILIARY ACTUATING ATTACHMENT FOR VEHICLE BRAKE SYSTEM
Filed May 17, 1954     3 Sheets-Sheet 2
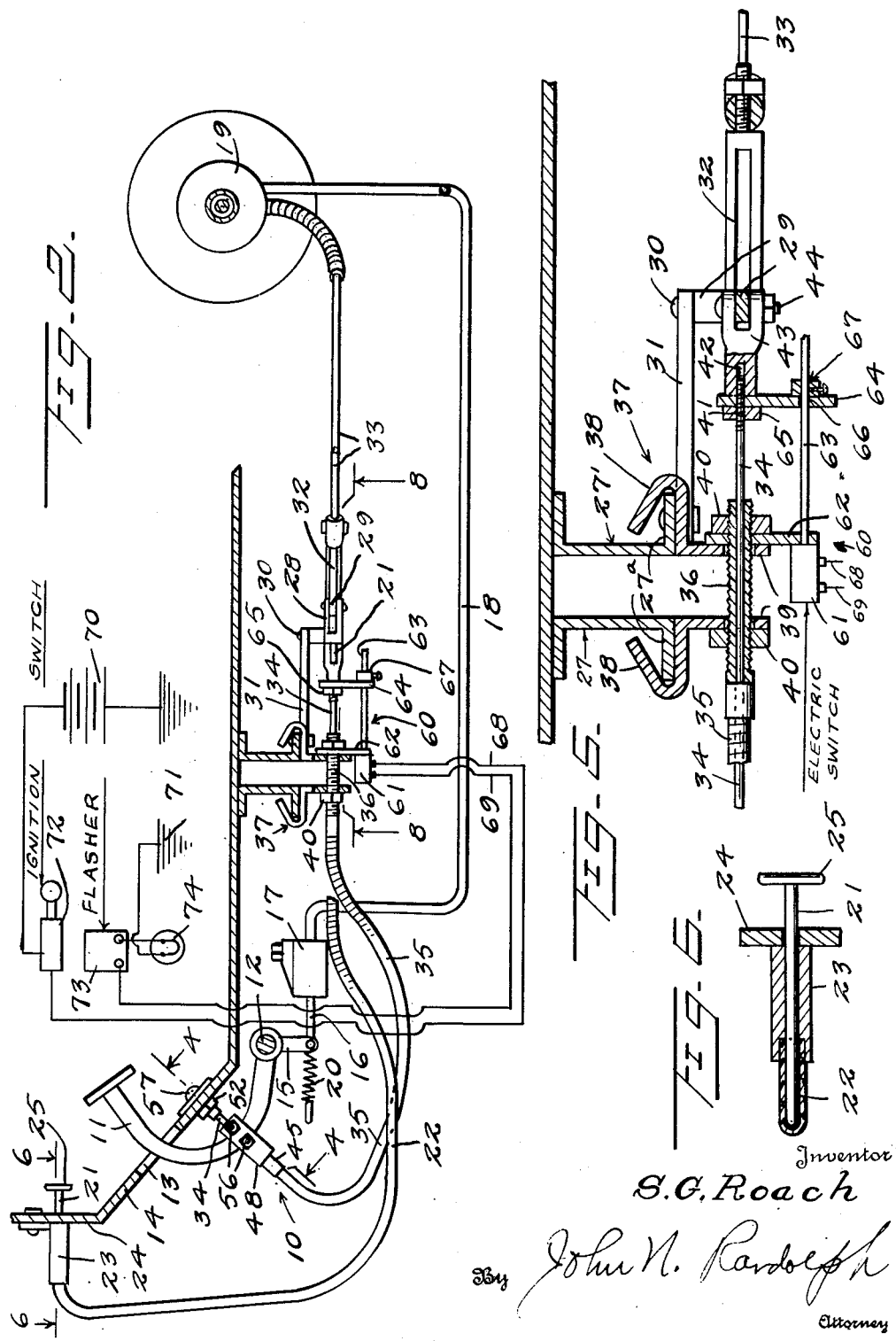
Inventor
S. G. Roach
By John N. Randolph
Attorney

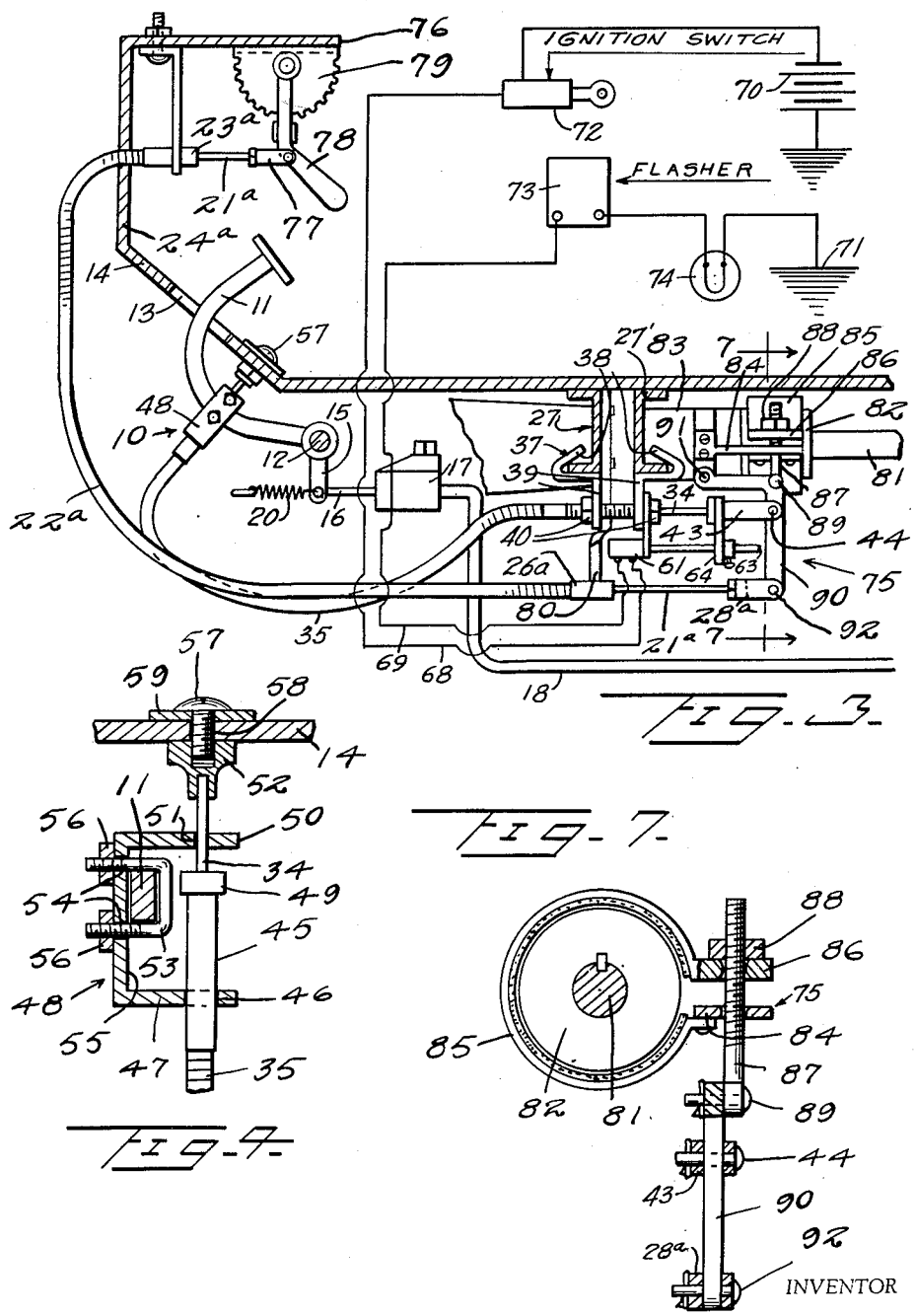

United States Patent Office 2,778,455
Patented Jan. 22, 1957

2,778,455

AUXILIARY ACTUATING ATTACHMENT FOR VEHICLE BRAKE SYSTEM

Stanley G. Roach, St. Albans, W. Va.

Application May 17, 1954, Serial No. 430,221

5 Claims. (Cl. 188—106)

This invention relates to a novel attachment or accessory capable of being readily applied to conventional brake systems of motor vehicles to provide an auxiliary means whereby the vehicle brakes will be applied automatically in the event of failure of the conventional brake actuating system.

More particularly, it is an object of the present invention to provide a unit forming a mechanical connection between the brake pedal of a motor vehicle and a conventional brake of the vehicle to accomplish by a mechanical means a brake applying action in the event that a conventional hydraulic brake system fails to function as, for example, due to a leakage in the fluid system thereof.

A further object of the invention is to provide an auxiliary actuating attachment of extremely simple construction having a unique connection with the brake pedal whereby normal operation of the brake pedal to apply the vehicle brakes will not produce an operation of the attachment.

A further object of the invention is to provide an attachment which is so constructed that it may be readily connected to a conventional part of the vehicle by means of which a braking action is applied by the operation of the "parking" or "emergency" brake, so that said conventional brake actuating part will be actuated by the foot pedal upon failure of the hydraulic brake system to which the foot pedal is connected.

A further object of the invention is to provide an attachment including a warning means for indicating to the driver of the vehicle when a failure or partial failure of the hydraulic system occurs or when an excessive brake wear exists, causing utilization of the auxiliary attachment.

Still another object of the invention is to provide such a warning means which will additionally warn the vehicle driver that the parking brake is applied before operation of the vehicle is initiated.

Various other objects and advantages of the invention will hereinafter become more fully apparent from the following description of the drawings, illustrating a presently preferred embodiment thereof, and wherein:

Figure 1 is a bottom plan view showing the attachment in an applied position associated with one conventional form of vehicle brake system;

Figure 2 is a longitudinal sectional view taken substantially along a plane as indicated by the line 2—2 of Figure 1 and including a diagrammatic illustration of the electric circuit of the warning unit;

Figure 3 is a side elevational view of the attachment, partially diagrammatic, showing the attachment associated with a different form of vehicle brake system;

Figure 4 is an enlarged fragmentary sectional view taken substantially along a plane as indicated by the line 4—4 of Figure 2;

Figure 5 is an enlarged fragmentary longitudinal sectional view taken substantially along a plane as indicated by the line 5—5 of Figure 1;

Figure 6 is an enlarged sectional view taken substantially along a plane as indicated by the line 6—6 of Figure 2;

Figure 7 is an enlarged fragmentary cross sectional view taken substantially along a plane as indicated by the line 7—7 of Figure 3, and Figure 8 is an enlarged horizontal sectional view taken substantially along a plane as indicated by the line 8—8 of Figure 2.

Referring more specifically to the drawings, the auxiliary vehicle brake actuating attachment comprising the invention is designated generally 10. The attachment 10 is illustrated in Figures 1, 2, 4, 5, 6 and 8 in conjunction with a conventional type of brake system employed for motor vehicles. Said brake system includes a brake pedal 11 which is pivotally mounted at 12 and which extends through a slot 13 of an inclined floor board portion 14. Swinging movement of the brake pedal 11 about its pivot 12, when depressed by the foot, effects a rearward swinging movement of a lever element 15 by which a piston rod 16 of the master cylinder 17 of the hydraulic brake system of the vehicle is displaced inwardly of the master cylinder casing to cause the hydraulic medium under pressure to be conveyed through the conduit system 18 to the brakes of the four wheels of the vehicle, only the two rear wheel brakes 19 of which have been illustrated. A pull spring 20 returns the parts to their released positions, as illustrated in Figure 2, when pressure on the brake pedal 11 is released. The conventional brake system of the vehicle also includes a flexible shaft or cable 21 which is slidably disposed in a flexible metal tubing 22. The flexible tubing 22, as seen in Figures 2 and 6, has a rigid sleeve portion 23 attached to one end thereof which is suitably secured to the forward side of the fire wall or instrument panel 24 of the vehicle. One end of the cable 22 extends from said sleeve 23 and slidably through the wall 24 and terminates in a handle 25. The other end of the flexible tubing 22 terminates in a rigid sleeve portion 26 which is suitably secured to a cross frame part 27 of the vehicle chassis. The flexible cable 21 projects beyond said end 26 and has its terminal threadedly connected to a clevis 28 which is pivotally connected to one end of an actuating lever 29. The lever 29 extends substantially transversely with respect to the vehicle chassis and has its opposite end pivoted at 30 to an arm 31 which is fixed to and extends rearwardly from a cross brace 27'. A link 32 is pivotally connected at one end thereof to the lever 29, near its pivot 30, and extends rearwardly therefrom. The opposite end of the link 32 is connected to the intermediate portion of a cable 33 the ends of which extend rearwardly in diverging relationship from said link 32 and are connected to suitable mechanical auxiliary brake actuating means of the rear wheel brakes 19 for applying the rear wheel brakes when a forward pull is exerted on said cable ends 33 and link 32. It will be obvious that, when the handle 25 is pulled from left to right as seen in Figures 2 and 6, the cable 21 will exert a forward pull on the lever 29 to produce this forward pull on the link 32 for accomplishing the conventional mechanical actuation of the rear wheel brakes. These parts constitute the conventional parking or emergency brake of the vehicle. The parts 11 through 33, inclusive, are of conventional construction and constitute no part of the present invention but have been illustrated and briefly described merely to afford a clearer understanding of the attachment 10 and how it is uniquely adapted to function with the parking or emergency brake actuating means 21—33.

The auxiliary brake actuating attachment 10 likewise includes a flexible cable or shaft 34 which is slidably mounted in a flexible tubular metal casing 35. As best seen in Figures 5 and 8, the tubular casing 35 is provided at one end thereof with a rigid externally threaded tubular extension 36 through which and to beyond which a rear end of the cable 34 slidably extends. The tubular member 36 additionally constitutes the bolt of a clamp, designated generally 37, which includes two corresponding sections having inwardly opening channeled upper portions 38 which engage above and beneath outwardly extending bottom flanges 27a of the cross braces 27 and 27'. Said clamp sections have depending substantially parallel spaced bottom portions 39 which extend downwardly from the flange engaging portions 38 and through which the threaded tube 36 slidably extends. The tube 36 has nuts 40 threaded thereon between which the clamp portions 39 are disposed for retaining the clamp 37 in engagement with the cross braces 27 and 27'. The rear end of the cable or flexible shaft 34 is threaded as seen at 41 in Figure 5 to threadedly engage a threaded socket 42 of a clevis 43, by means of which said clevis is adjustably connected to the cable 34. The other bifurcated end of the clevis 43 is pivotally connected to the lever 29 as seen at 44, preferably between the pivotal connection of the clevis 28 and link 32 to said lever 29.

As best seen in Figure 4, a rigid sleeve 45 is fixed to and projects from the opposite end of the tubular casing 35 and extends slidably through an opening 46 in one leg 47 of a yoke member 48. The other end of the sleeve 45 is provided with a head or enlargement 49 which is disposed in the yoke 48 between the leg 47 and a second leg 50 of the yoke member. The other end of the cable 34 extends from the sleeve 45 slidably through an opening 51 in the leg 50 and has its terminal portion anchored in a cap nut 52. A U-shaped bolt 53 has threaded ends which extend slidably through longitudinally spaced openings 54, formed in the intermediate portion 55 of the yoke member 48. Said threaded bolt ends extend outwardly of the yoke member through said openings 54. A portion of the brake pedal 11, disposed beneath the floor board part 14, extends through the yoke 48 and through the U-bolt 53 and between the intermediate portion of said bolt and the yoke portion 55. Nuts 56 engage the threaded bolt ends and bear against the outer side of the yoke portion 55. Tightening of these nuts 56 clamps the bolt 53 and yoke member 48 to the brake pedal 11, as illustrated in Figures 1, 2 and 4. A headed bolt 57 extends downwardly through an opening 58 in the floor board portion 14 and is threadedly secured to the nut 52, which is disposed against the underside of said floor board portion. The bolt 57 may carry a washer 59 which bears against the upper side of the floor board portion 14. The cable end anchored to the nut 52 is thus immovably anchored relatively to the floor board portion 14.

By adjusting the nuts 40 on the sleeve portion 36, said sleeve portion of the tubular casing 35 may be adjustably moved longitudinally of the vehicle for varying the spacing between the upper yoke leg 50 and the enlarged end 49 of the sleeve 45 to vary the extent of downward travel of the yoke member 48 with the brake pedal 11 and relatively to the casing 35 and sleeve 45, before the yoke leg 50 moves into engagement with the sleeve end 49, after which a further downward movement of the pedal 11 and yoke 48 will cause the sleeve 45 and the adjacent end of the tubular casing 35 to move with the brake pedal 11 and yoke 48. This lost motion movement of the brake pedal and yoke relatively to the sleeve 45 is sufficient to take care of the normal depressing movement of the brake pedal to effect a conventional hydraulic application of the wheel brakes without effecting any movement of the sleeve 45 or the end of the casing 35 which is secured thereto. Should a complete or a more common partial failure of the hydraulic system 17, 18 occur, the pressure in the hydraulic system will not stop downward swinging movement of the brake pedal 11 before the yoke leg 50 strikes the sleeve end 49, but rather will allow the brake pedal to continue to move downwardly under the foot pressure. Consequently, the leg 50 will strike the sleeve end 49 and further downward movement of the brake pedal 11 will result in the sleeve 45 and the adjacent end of the casing 35 moving with the brake pedal and away from the end of the cable 34 which is anchored immovably by the nut 52. The casing 35 is flexible but non-contractile. Therefore, as the casing end 35 which is connected to the sleeve 45 moves away from the cable end anchored to the nut 52 the cable 34 will be drawn through the casing 35 from right to left as seen in Figure 2 resulting in a pull being exerted on the cable end 41 and on the clevis 43. This pull will cause the lever 29 to be swung in a forward direction about its pivot 30 exerting a forward pull on the link 32 and the cable ends 33 for applying a braking action mechanically to the two rear wheel brakes 19 in the same manner that the mechanical braking action is applied to these wheel brakes by a rearward pull on the handle 25 of the parking brake cable 21.

It will be noted that even a slight leakage in the hydraulic system 17, 18, the most common failure of hydraulic brake systems, will automatically result in operation of the attachment 10 for mechanically applying the rear wheel brakes 19 even though a hydraulic pressure is built up as the pedal 11 is depressed, since a loss of pressure will result in the brake pedal 11 traveling further than its normal travel and further than the lost motion travel distance between the yoke leg 50 and sleeve end 49, as previously described and as illustrated in Figure 4. Additionally, a deficiency in the amount of fluid in the hydraulic system or an excessive wear of the brake bands will produce a mechanical actuation of the rear wheel brakes by the attachment 10.

In order to warn the vehicle driver of a partial failure of the hydraulic system due to a slight leakage therein or of a need for replenishing the fluid supply of the hydraulic system, or that an adjustment of the brakes is needed, any of which conditions will result in actuation of the attachment 10 by depressing of the brake pedal 11 to mechanically actuate the rear wheel brakes 19, a warning system is provided and which constitutes a part of the attachment 10. Said warning system, designated generally 60, includes a conventional electric switch 61 which normally assumes a circuit closing position. A hanger 62 is connected to the switch 61 and extends upwardly therefrom and is suspended from the threaded sleeve 36 between one of the nuts 40 and one of the clamp portions 39, as best illustrated in Figure 5. A rod 63 extends slidably from the switch 61 and constitutes a conventional part thereof. An outward pull on the rod 63 causes the switch 61 to assume a circuit interrupting position and release of the rod 63 automatically returns the switch 61 to a circuit closing position. A rigid bar or arm 64 is mounted on the cable end 41 between the clevis 43 and a nut 65, which is threaded on the cable end 41. The arm 64 depends from the cable end 41 and has an opening 66 through which the rod 63 loosely extends. A stop 67, comprising a collar and setscrew, is adjustably mounted on and secured to the rod 63 beyond the arm 64 and normally bears against said arm to maintain the rod 63 in an extended position relatively to the switch 61 for maintaining the switch 61 in a circuit interrupting position. However, when the cable 34 is moved from right to left as seen in Figures 1, 2 and 5, the arm 64 moves away from the stop 67 permitting the rod 63 to move from right to left to allow the switch 61 to assume a circuit closing position.

A pair of conductor wires 68 and 69 are connected to and lead from the two contact posts of the switch 61. The other end of the conductor wire 68 is connected to the positive side of a source of electric current, such as a vehicle storage battery 70, and the other end of the conductor wire 69 is grounded as seen at 71. The conventional vehicle ignition switch 72 is interposed in the conductor wire 68 for breaking the electric circuit to the switch 61 when the ignition switch is in an "off" position. A conventional flasher unit 73 and a light bulb 74 are interposed in the conductor wires 69 between the switch 61 and ground 71. However, it is to be understood that any other type of electrical warning signal such as a bell or buzzer may be substituted for the visual warning signal 74.

Accordingly, whenever the vehicle is in operation the ignition switch 72 is in an "on" position so that when the attachment 10 is actuated, as previously described, the switch 61 will be permitted to assume a circuit closing position so that the light 74, located in a position readily visible to the vehicle operator, will be intermittently illuminated to produce a flashing warning signal indicating a failure or partial failure of the hydraulic system 17, 18 or a need for replenishing the supply of liquid therein or a need for adjustment of the vehicle brakes.

Additionally, the flashing warning signal will be produced whenever the ignition switch is turned on and while the parking brake is applied to warn the vehicle driver to release the parking brake before attempting to place the vehicle in motion.

Figures 3 and 7 show the attachment 10 employed with another type of parking brake. The attachment 10 as shown in Figures 3 and 7 corresponds in all detail with the attachment 10 previously described and all of the parts thereof are mounted in same manner as previously described, and as illustrated in Figures 1, 2, 4, 5 and 8, with the exception that the clevis 43 is turned so that its bifurcated end can engage a vertical lever element rather than a horizontal lever element.

The conventional parking brake system 75, as illustrated in Figures 3 and 7, includes a flexible tubular casing 22a, corresponding to the casing 22 and through which a flexible cable 21a, corresponding to the cable 21, slidably extends. One end portion of the casing 22a extends through the vertical wall 24a and terminates in a sleeve and bracket member 23a which is suspended from a shelf 76 of the vehicle which extends rearwardly from the wall 24a. The end of the cable 21a which extends from the sleeve 23a carries a clevis 77 which is pivotally connected to a lever 78 which is in turn pivotally supported on a latch segment 79. The latch segment 79 is likewise suspended from the shelf 76. The other end 26a of the casing 22a is supported by a bracket 80 which is suitably fixed to a part of the vehicle cross brace 27.

Instead of the cable 21a actuating the brake shoes of the rear wheel brakes, the parking brake 75 is associated with the vehicle drive shaft 81 to which a brake drum 82 is fixed immediately to the rear of the transmission housing 83. A bracket 84 is fixed to and extends rearwardly from the transmission housing 83 and provides a fixed support for one end of a brake band 85 which extends from the support 84 around the underside of the drum 82 and thence over the drum. A rigid flange 86 extends outwardly from the free end of the brake band 85 above and spaced from the support 84. A rod 87 extends slidably through the support 84 and loosely through the flange 86 and has a threaded upper end on which a nut 88 is mounted, forming an adjustable stop, which bears on the upper side of the flange 86. The lower end of the rod 87 is pivoted at 89 to the apex of an inverted L-shaped lever 90, one leg of which extends forwardly from the rod 87 and is pivoted at 91 to a depending portion of the anchor end of the support 84. The clevis 28a of the cable 21a, corresponding to the clevis 28, is pivotally connected at 92 to the terminal of the other depending leg of the inverted L-shaped lever 90. The clevis 43 of the attachment 10 is pivoted at 44 to the L-shaped lever 90 between the pivots 89 and 92. As previously stated, the attachment 10 as shown in Figure 3 is otherwise mounted in the same manner as illustrated in Figures 1 and 2, including the flashing warning signal.

When the brake lever 78 is swung rearwardly or from left to right as seen in Figure 3, a forward, right to left pull is exerted by the cable 21a on the clevis 28a on the clevis to cause the bellcrank or inverted L-shaped lever 90 to swing clockwise about its pivot 91 to exert a downward pull on the rod 87 and the free end of the brake band 85 for tightening the brake band around the drum 82 for applying a braking action thereto. It will be readily apparent that when the clevis 43 is pulled from right to left, as seen in Figure 3, this same action will occur to tighten the brake band 85.

In view of the detailed description of the operation of the attachment 10 in connection with the parking brake as illustrated in Figures 1 and 2, a further description of the operation of said attachment when utilized with the parking brake 75 of Figure 3 is considered unnecessary.

It is to be understood that the attachment 10 is likewise well adapted for use with other conventional forms of parking brakes of motor vehicles and that the drawings are only intended to illustrate two of the most common of such parking brake arrangements.

Various modifications and changes are contemplated and may obviously be resorted to, without departing from the spirit or scope of the invention as hereinafter defined by the appended claims.

I claim as my invention:

1. In combination with a hydraulic brake system of a motor vehicle including a pedal for actuating the hydraulic brake system, and a mechanically actuated parking brake of the vehicle including a lever fulcrumed for swinging movement relatively to the vehicle for mechanically applying the vehicle parking brake when swung in one direction; an auxiliary brake actuating attachment comprising a flexible cable having one end connected to said lever at a point spaced from the lever fulcrum, means anchoring the other end of said cable immovably to a part of the vehicle above and adjacent a portion of the brake pedal, a flexible casing enclosing a portion of said cable and terminating in spaced relationship to the cable ends, means fixedly positioning one end of said flexible casing relatively to the cable and to said lever, said casing having a rigid opposite end located adjacent the brake pedal, and a lost motion means secured to and movable with the brake pedal and having a portion slidably engaging said rigid casing end and having another portion slidably engaging the cable beyond said rigid casing end and normally spaced from said rigid end of the casing a distance greater than the normal travel of the brake pedal portion engaged by said lost motion means during normal application of the brakes by the hydraulic brake system, said last mentioned portion of the lost motion means being movable into engagement with the rigid casing end as a result of an excessive brake pedal travel toward a brake applying position to cause said rigid casing end to be displaced away from the anchored cable end whereby a pull is exerted on the cable causing the cable to slide through the casing in a direction inwardly through the first mentioned fixed casing end for exerting a pull on said lever to apply the parking brake of the vehicle, said lost motion means comprising a yoke shaped member, a clamp securing said yoke shaped member to the brake pedal, said yoke shaped member having a lower leg slidably engaging said rigid casing end and an upper leg disposed above and normally spaced from said rigid casing end and constituting the portion slidably engaging said cable, said first mentioned fixed casing end comprising an externally threaded sleeve, a clamp detachably secured to a frame portion of the vehicle, and said sleeve being secured to and supported in a fixed position relatively to the vehicle by said clamp.

2. An auxiliary brake applying attachment as in claim 1, and means adustably securing said sleeve to the clamp for adjusting the flexible casing longitudinally of the vehicle for varying the spacing between the distal end of the rigid end portion of said casing and the part of said lost motion means disposed therebeyond.

3. An auxiliary brake actuating attachment as in claim 2, said externally threaded sleeve forming a part of said clamp and extending through sections of the clamp, and nuts engaging said sleeve and exerting a pressure on the clamp sections through which the sleeve extends for securing the clamp to the vehicle frame portion engaged thereby.

4. In combination with a hydraulic brake system of a motor vehicle including a pedal for actuating the hydraulic brake system, and a mechanically actuated parking brake of the vehicle including a lever fulcrumed for swinging movement relatively to the vehicle for mechanically applying the vehicle parking brake when swung in one direction; a brake actuating attachment including a flexible member having one end connected to the lever at a point spaced from the lever fulcrum and a fixed opposite end located adjacent a part of said brake pedal, means slidably engaging said flexible member adjacent its fixed end, a lost motion member secured to a portion of the brake pedal having a lower end slidably engaging said flexible member engaging means and an upper end slidably engaging said flexible member between the fixed end thereof and the adjacent end of said engaging means, said lost motion member being connected to be movable with the brake pedal relatively to said engaging means during normal travel of the brake pedal for applying the brakes and being movable into engagement with said engaging means to cause movement of the engaging means with the brake pedal and lost motion member in the travel of the brake pedal beyond its extent of travel in a normal brake applying movement for exerting a pull on the end of the flexible member connected to the parking brake lever to actuate the parking brake lever for applying the parking brake, an externally threaded sleeve, a clamp secured to a frame portion of the vehicle and in which said sleeve is supported in a fixed position relative to the lever, and a flexible casing having one end secured to the sleeve and an opposite end secured to said flexible member engaging means, said flexible member extending slidably through the sleeve and casing.

5. An auxiliary brake actuating mechanism as in claim 4, and means adjustably securing the sleeve to the clamp for adjustably positioning the flexible member engaging means relative to said lost motion member for varying the extent of travel of said member with the pedal relative to said means.

References Cited in the file of this patent
UNITED STATES PATENTS

| | | |
|---|---|---|
| 2,031,741 | Smith | Feb. 25, 1936 |
| 2,056,942 | Krueger | Oct. 13, 1936 |
| 2,219,518 | Engle et al. | Oct. 29, 1940 |
| 2,466,363 | Bodinaux et al. | Apr. 5, 1949 |
| 2,615,350 | Wahlberg et al. | Oct. 28, 1952 |
| 2,664,973 | Colley | Jan. 5, 1954 |